United States Patent
Boffi et al.

(10) Patent No.: US 9,991,690 B2
(45) Date of Patent: Jun. 5, 2018

(54) ACCESSORY FOR HIGH VOLTAGE DIRECT CURRENT ENERGY CABLES

(71) Applicant: PRYSMIAN S.p.A., Milan (IT)

(72) Inventors: Paolo Boffi, Milan (IT); Marco Marelli, Milan (IT)

(73) Assignee: PRYSMIAN S.p.A., Milan (IT)

( * ) Notice: Subject to any disclaimer, the term of this patent is extended or adjusted under 35 U.S.C. 154(b) by 0 days. days.

(21) Appl. No.: 15/544,607

(22) PCT Filed: Jan. 21, 2015

(86) PCT No.: PCT/IB2015/050469
§ 371 (c)(1),
(2) Date: Jul. 19, 2017

(87) PCT Pub. No.: WO2016/116779
PCT Pub. Date: Jul. 28, 2016

(65) Prior Publication Data
US 2018/0019582 A1    Jan. 18, 2018

(51) Int. Cl.
*H02G 15/02* (2006.01)
*H01B 7/295* (2006.01)
(Continued)

(52) U.S. Cl.
CPC ........... *H02G 15/003* (2013.01); *H01B 3/002* (2013.01); *H02G 15/064* (2013.01); *H02G 15/08* (2013.01); *H01B 3/441* (2013.01); *H01B 9/02* (2013.01)

(58) Field of Classification Search
CPC .... H02G 15/003; H02G 15/064; H02G 15/08; H01B 9/02
(Continued)

(56) References Cited

U.S. PATENT DOCUMENTS

| | | | | | |
|---|---|---|---|---|---|
| 4,717,236 A | * | 1/1988 | Dewing | ............... | G02B 6/4401 |
| | | | | | 385/109 |
| 6,005,192 A | * | 12/1999 | Mashikian | ........... | H01B 7/2813 |
| | | | | | 174/110 AR |

(Continued)

FOREIGN PATENT DOCUMENTS

| CN | 102417683 A | 4/2012 |
|---|---|---|
| GB | 2464610 A | 4/2010 |
| WO | WO 2015/059520 A1 | 4/2015 |

OTHER PUBLICATIONS

International Search Report dated Sep. 29, 2015 in PCT/IB2015/050469.

*Primary Examiner* — Sherman Ng
(74) *Attorney, Agent, or Firm* — Oblon, McClelland, Maier & Neustadt, L.L.P.

(57) ABSTRACT

The present invention relates to an accessory for high-voltage direct-current (HVDC) energy cables comprising: at least one element made from a crosslinked elastomeric polymer material, and at least one scavenging layer comprising zeolite particles. The zeolite particles are able to scavenge, very efficiently and irreversibly, the by-products deriving from the cross-linking reaction, so as to avoid space charge accumulation in the element during the accessory lifespan. Moreover, the zeolite particles can prevent the crosslinking by-products present in the element of a non-degassed accessory from migrating towards the insulating layer of the energy cable on which the accessory is mounted.

12 Claims, 4 Drawing Sheets

(51) Int. Cl.
*H02G 15/00* (2006.01)
*H02G 15/064* (2006.01)
*H01B 3/00* (2006.01)
*H02G 15/08* (2006.01)
*H01B 9/02* (2006.01)
*H01B 3/44* (2006.01)

(58) Field of Classification Search
USPC .......................................... 174/75 R, 110 R
See application file for complete search history.

(56) References Cited

U.S. PATENT DOCUMENTS

| | | | |
|---|---|---|---|
| 6,205,276 B1* | 3/2001 | Anelli | G02B 6/4494 |
| | | | 385/100 |
| 6,383,634 B1* | 5/2002 | Kornfeldt | H01B 3/20 |
| | | | 174/110 PM |
| 2003/0164483 A1* | 9/2003 | Scelza | C08K 3/02 |
| | | | 252/601 |
| 2007/0262483 A1* | 11/2007 | Grasselli | B29C 44/322 |
| | | | 264/172.19 |
| 2010/0140877 A1* | 6/2010 | Pratley | H02G 3/088 |
| | | | 277/316 |
| 2014/0220343 A1* | 8/2014 | Choi | H01B 3/18 |
| | | | 428/389 |

* cited by examiner

ACCESSORY FOR HIGH VOLTAGE DIRECT CURRENT ENERGY CABLES

BACKGROUND OF THE INVENTION

The present invention relates to an accessory for high voltage direct current (HVDC) energy cables, such as a cable joint or a cable termination.

Cables for transporting electric energy generally include at least one cable core. The cable core is usually formed by an electrically conductive metal conductor sequentially covered by an inner polymeric layer having semiconducting properties, an intermediate polymeric layer having electrically insulating properties, an outer polymeric layer having semiconducting properties. Cables for transporting high voltage electric energy generally include at least one cable core surrounded by a screen layer, typically made of a metal or of a metal and a polymeric material. The screen layer can be made in form of wires (braids), of a tape helically wound around the cable core or of a sheet longitudinally wrapped around the cable core.

The polymeric layers surrounding the conductor are commonly made from a polyolefin-based crosslinked polymer, in particular crosslinked polyethylene (XLPE), or elastomeric ethylene/propylene (EPR) or ethylene/propylene/diene (EPDM) copolymers, also crosslinked, as disclosed, e.g., in WO 98/52197. The crosslinking step, carried out after extruding the polymeric material onto the conductor, gives the material satisfactory mechanical and electrical properties even under high temperatures both during conventional use and with current overload.

The crosslinking process of polyolefin materials, particularly polyethylene, requires the addition to the polymeric material of a crosslinking agent, usually an organic peroxide, and subsequent heating at a temperature to cause peroxide cleavage and reaction. By-products are formed mainly deriving from the decomposition of the organic peroxide. In direct current (DC) energy cables operating with a continuous electrical field, such by-products, being entrapped within the crosslinked material, cause an accumulation of space charges which may generate electrical discharges and eventually insulation piercing. For instance, dicumyl peroxide, a commonly used crosslinking agent for cable insulation, gives place to methane (light by-product) and heavy by-products, mainly acetophenone and cumyl alcohol. Methane can be eliminated from the cable core with a short degassing process at a relatively low temperature (about 70° C.), while acetophenone and cumyl alcohol can be removed only by subjecting the cable core to a prolonged degassing process, at a temperature suitable to cause migration of the by-products (usually about 70° C.÷80° C.) and subsequent evaporation from the cable core. This degassing process must be performed for a long time (usually from 15 days to about 2 months, depending on the cable core dimensions) and is carried out batchwise in large degassing devices which can host a given cable length. This is particularly critical for HVDC cables.

Energy cable accessories are used in an energy network to restore the insulation and electric field control over a cable portion where the conductor was exposed, such as in case of connection between two energy cables or between an energy cable and another network component, such as a transformer, a generator, a bare conductor of an overhead line or the like. Cable accessories include cable joints and cable terminations.

A cable joint generally comprises a sleeve which is fitted over the conductors' connection. The sleeve may comprise different parts, each having a different function. Typically, starting from the innermost layer, a sleeve may comprise a tubular electrode made of a semiconducting material suitable for controlling the electrical field around the cable conductors' connection, a tubular insulating element which covers the electrode, and an outer semiconducting layer enveloping the tubular insulating element. The sleeve usually has a substantially cylindrical central portion and two substantially conical opposing end portions (stress-relief cones), typically made of semiconducting material.

A termination is a device fitted to the end of an energy cable to ensure its mechanical and electrical connection to a bare conductor and to maintain the insulation up to the point of connection; the bare conductor can be for example an overhead conductor or a different device, such as an electrical power source or a transformer, etc.

Terminations for high voltage electric cables typically comprise a sleeve made of elastomeric material and a conductive rod adapted to be connected to the bare conductor. A connector is provided inside the sleeve to mechanically and electrically connect the conductive rod to the electrical cable, so as to provide the electrical connection between the electrical cable and the bare conductor. The sleeve further comprises a semi-conductive conical insert (or stress-relief cone) for controlling the electrical field within the sleeve, in particular to avoid the presence of areas with high concentration of electrical field wherein undesired electrical discharges and breakdowns could occur. A conductive element is arranged in a radial outer position with respect to the semi-conductive cylindrical insert in a contact relationship therewith.

The insulating elements of pre-moulded cable joints or terminations are commonly made of crosslinked elastomeric ethylene copolymers, such as EPR or EPDM polymers. The accumulation of space charges in the matrix of an elastomeric polymer, such as an EPR or EPDM polymer, is a less relevant issue compared to XLPE polymers. These elastomeric polymers in fact generally contain charges dispersed in the polymeric matrix (e.g. lead oxides) which prevent the accumulation of space charges. For this reason, the accessories comprising insulating element made from the said elastomeric materials can be used—in principle—without being subjected to a degassing process for removing the crosslinking by-products.

However, since the accessories are to be used with HVDC cables, the accessories made of EPR/EPDM are precautionary subjected to degassing as well in order to minimize the risk of accumulation of space charges in the cable insulating layers. In the presence of intense currents, in fact, the crosslinking by-products embedded in the polymer matrix of the insulating element of the accessories can migrate towards the insulating layer of the degassed cables and consequently cause accumulation of space charges which eventually could result in the insulation piercing. It is apparent that the need for degassing the accessories substantially increases the time and production cost of the same.

It is therefore felt the need to provide pre-moulded accessories, particularly for HVDC cables, having at least an insulating element made from a crosslinked polymer material that can be used without being preventively degassed.

In US 2010/0314022 a process is described for producing an insulated DC cable with an extruded polymer based electrical insulation system, which comprises the steps of: providing a polymer based insulation system comprising a compounded polymer composition, preferably a compounded polyethylene composition; optionally cross-linking the polymer composition; and finally exposing the polymer based insulation system to a heat treatment procedure while the outer surface of the polymer based insulation system is covered by a cover impermeable to at least one substance present in the polymer based insulation system in a non-homogenous distribution, thereby equalizing the concentration of the at least one substance in the polymer based insulation system. The at least one substance comprises typically cross linking by-products and various additives, which typically increase the material conductivity. Preferably a thin metallic foil or similar is wrapped around the roll of DC cable. Alternatively, the impermeable cover can be the metallic screen or the outer covering or sheath arranged outside the metallic screen. The overall effect of such a process is that of equalizing the concentration of the cross-linking by-products within the insulating layer.

JP 64-024308 relates to a DC power cable provided with a space charge buffer layer placed between the inner semiconducting layer and the insulating layer or between the outer semiconducting layer and the insulating layer, the space charge buffer layer being formed by a copolymer of ethylene with an aromatic monomer, e.g. styrene, in an amount from 0.01 to 2 mol % per 1 mol of ethylene. Due to the resonance effect of the benzene ring of the aromatic monomer, the surrounding electron energy is absorbed and the formation of space charge is prevented, and in addition it is possible to improve the dielectric strength of the base polymer.

JP 02-253513 relates to a cross-linked polyethylene insulation cable that prevents oxidative degradation caused by contact with oxygen and enables continuous operation at high temperatures. As cracked residue of the organic peroxide, cumyl alcohol undergoes degradation to form α-methylstyrene and water. The deydradation of cumyl alcohol is accelerated in the presence of oxygen. The moisture that is formed may cause appearance of voids and bow-tie trees with consequent degradation of the insulating material. A plastic material containing an oxygen absorbent is arranged on the central part and the outer semiconducting layer of the conductor. As oxygen absorbent, a deoxidizer may be used, such as a commercially available product known as Ageless by Mitsubishi Gas Chemical Co., which is formed by iron oxide/potassium chloride.

SUMMARY OF THE INVENTION

The Applicant has faced the problem of providing safe pre-moulded accessories for HVDC cables. In particular, these accessories, being made of at least one element made from a crosslinked polymer material, should ensure that the risk of damages of the insulating layer of the cable due to the accumulation of space charges is substantially absent even when their crosslinked polymer material elements are not preventively degassed.

The above problem and others that will appear more clearly from the following description can be solved by providing an accessory containing zeolite particles placed in the vicinity of the element made from a crosslinked elastomeric polymer material.

The Applicants have found that zeolite particles are able to capture, very efficiently and irreversibly, the by-products deriving from the cross-linking reaction of the polymer material thus avoiding space charge accumulation in the material during the accessory lifespan. The zeolite particles can prevent the crosslinking by-products present in the element of a non-degassed accessory from migrating towards the insulating layer of the energy cable on which the accessory is mounted as a consequence of the heating caused, for example, by the flowing current.

Therefore, according to a first aspect, the present invention relates to an accessory for high voltage direct current (HVDC) energy cables comprising:
  at least one element made from a crosslinked elastomeric polymer material, and
  at least one scavenging layer comprising zeolite particles.

For the purpose of the present description and of the claims that follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

In the accessory of the present invention the element made from a crosslinked elastomeric polymer material can be an electrically insulating element or a stress-relief cone having semiconducting properties.

In the present description and claims the term "high voltage" generally means a voltage higher than 35 kV.

As "insulating element" it is meant an element made of a material having electrically insulating properties, namely having a dielectric rigidity (dielectric breakdown strength) of at least 5 kV/mm, preferably of at least 10 kV/mm.

As "crosslinked insulating element" it is meant an insulating element made of a crosslinked polymer.

For the purpose of the present description and of the claims that follow, as "irreversible absorption" and the like it is meant that once absorbed by the zeolite particles no substantial release of by-products is observed even when the accessory is mounted on an HVDC cable under working conditions.

The scavenging layer can comprises a sheath of polymer material where the zeolites can be dispersed.

Preferably, the scavenging layer is applied in a radial external position with respect to the element made from a crosslinked elastomeric polymer material.

Advantageously, the scavenging layer is applied in a radial external position with respect to the insulating element, preferably in direct contact with the insulating element; alternatively an outer semiconducting layer is interposed between the insulating element and the scavenging layer.

The scavenging layer can be in form of a sheath made of a polymer or polymer composition having elastic properties which allows a proper expansion of the layer during its mounting around the element made from a crosslinked elastomeric polymer material as well as its steady gripping around the insulating elements after mounting.

Preferably, the polymer material of the scavenging layer has a 200% elastic modulus of from 2 MPa and 8 MPa according to ASTM D638-10.

The polymer material which forms the scavenging layer is preferably selected from: elastomeric copolymers of the ethylene with at least one alpha-olefin, silicon polymers, polymers or copolymers of butane—such as polyisobutylene (PIB) and copolymers butane/propylene (i.e. butyl rubbers)—and mixture thereof.

The zeolite particles can be dispersed in the polymer matrix of the scavenging layer during manufacturing of the latter. The sheath can be manufactured with the techniques known in the art, e.g. an extrusion process.

Alternatively, the scavenging layer can be in form of a tape supporting the zeolites and wound externally around the element made from a crosslinked elastomeric polymer material.

Preferably, the tape is made from a polymer-based material comprising at least one polymer selected from: elastomeric copolymer of ethylene with at least one alpha-olefin, silicon polymer, polymer or copolymer of butylene—preferably polyisobutylene (PIB) and copolymers butane/propylene (i.e. butyl rubbers)—and mixture thereof.

The zeolite particles can be dispersed in the polymer matrix of the tape during manufacturing of the latter. The tape can be manufactured with the techniques known in the art.

Preferably, the tape is a self-amalgamating tape. Self-amalgamating tapes are known in the field of energy cables as they are commonly used in cables, electrical joints as disclosed, for example, in http://en.wikipedia.org/wiki/Self-amalgamating_tape.

According to another embodiment, the scavenging layer can comprise a substrate which is a hygroscopic tape. Hygroscopic tapes are commonly used in energy cables to provide the cables with water-blocking properties. The hygroscopic tapes can be electrically non-conductive or semiconducting. On the tapes, usually made from a non-woven fabric of polymer filaments, particles of a hygroscopic material, for instance polyacrylate salts, are deposited by means of an adhesive material, typically polyvinyl alcohol (PVA). Such tapes can be modified according to the present invention by depositing on the polymer filaments a mixture of hygroscopic particles and zeolite particles. In particular, the polymer filaments can be moistened with a solution of an adhesive material, and then the zeolite particles are sprinkled thereon and remain entrapped in the solution and, after drying, in the adhesive material.

Tapes, such as self-amalgamating or hygroscopic tapes, forming the scavenging layer are helically wound around the cable forming the scavenging layer.

As regards the zeolite particles suitable for the present invention, they can be selected from a wide range of aluminosilicates of natural or synthetic origin, having a microporous structure that can accommodate a variety of cations, such as $Na^+$, $K^+$, $Ca^{2+}$, $Mg^{2+}$ and others. They act as molecular sieves due to their ability to selectively sort molecules mainly on the basis of a size exclusion process. Although not being bound to any theory to explain the present invention, the Applicant believes that zeolite particles are particularly effective as irreversible scavengers for the crosslinking by-products, such as acetophenone and cumyl alcohol, since these molecules, when entered within the zeolite microporous structure, seem to undertake oligomerization reactions (specifically, dimerization reaction) converting them into much more bulky molecules. As a result, the now bulky crosslinking by-products become irreversibly trapped within the zeolite structure and cannot migrate back outside, even after prolonged exposure to relatively high temperatures, such as those reached by the energy cable during use. Even in the absence of oligomerization reactions, the by-products mainly remain into the zeolite particles because their solubility into the crosslinked polymer is lower than that into the zeolite particles.

Preferably, the zeolite particles have a $SiO_2/Al_2O_3$ molar ratio equal to or lower than 20, more preferably equal to or lower than 15.

Preferably, the zeolite particles have a maximum diameter of a sphere than can diffuse along at least one (preferably all the three) of the cell axes directions (hereinafter also referred to as "sphere diameter") equal to or greater than 3 Å. As well known in the zeolite field, this sphere diameter provides quantitative information about the size of the channels present in the zeolite structure, which can develop in one dimension, two dimensions or three dimensions (the so called "dimensionality" which can be 1, 2 or 3). Preferably, the zeolite particles of the invention have a dimensionality of 2, more preferably of 3.

Preferably, the zeolite particles have a sodium content, expressed as $Na_2O$, equal to or lower than 0.3% by weight.

The zeolite particles having $SiO_2/Al_2O_3$ molar ratio, sphere diameter and sodium content in the preferred ranges according to the invention are capable to absorb an amount of high boiling cross-linking by-products in a given time higher than other zeolite particles having at least one of the mentioned feature out of the range according to the invention.

More details about zeolite nomenclature and parameters can be found, e.g., in IUPAC Recommendations 2001, *Pure Appl. Chem.*, Vol. 73, No. 2, pp. 381-394, 2001, or in the website of the International Zeolite Association (IZA) (http://www.iza-structure.org/).

As regards the amount of zeolite particles to be placed in the scavenging layer, it can vary within a wide range and mainly depends on the type of zeolite, the amount of by-products to be eliminated, the thickness of the insulating element and the final target by-products content. According to preliminary evaluations, assuming a content of about 1 wt % of cumyl alcohol into the accessory element/s made from a crosslinked elastomeric polymer material, the zeolite particles are preferably present in an amount of from 70 g/m to 1000 g/m for a 25 mm insulating thickness, more preferably from 70 g/m to 210 g/m for a 25 mm insulating thickness, the units being expressed as amount of zeolite particles (in grams) versus the length of the element (in meters).

In the case the scavenging layer is in form of a polymeric sheath, the amount of zeolite dispersed into the polymer material thereof should not impair the elastic properties of the sheath. In particular, the maximum amount of dispersed zeolite should be such to keep the elongation at break of the sheath (according to CEI EN 60811-1-1, 2001-06) greater than 500%, preferably from 600% to 1000%.

In view of the above ranges and indications, the skilled person is able to determine a suitable amount of zeolite particles to be added to a given scavenging layer without undue burden.

The accessories having at least an element made from a crosslinked polymer material according to the present invention are particularly suitable for use in association with HVDC energy cables. Preferably, the accessory is a pre-moulded electrical cable joint or a pre-moulded electrical cable termination, i.e. an accessory which can be wholly assembled in a factory.

As regards the crosslinked element of the accessory of the invention, in particular when it is an electrically insulating element, it preferably comprises at least one elastomeric copolymer of ethylene with at least one alpha-olefin, such as ethylene/propylene copolymer (EPR), ethylene/propylene/diene copolymer (EPDM) and mixtures thereof.

Preferably, the polymer forming the element is crosslinked by reaction with at least one organic peroxide. Preferably, the organic peroxide has formula $R_1$—O—O—$R_2$, wherein $R_1$ and $R_2$, equal or different from each other, are linear or, preferably, branched alkyls $C_1$-$C_{18}$, aryls $C_6$-$C_{12}$, alkylaryls or arylalkyls $C_7$-$C_{24}$. In a preferred embodiment, the organic peroxide is selected from: dicumyl peroxide, t-butyl cumyl peroxide, 2,5-dimethyl-2,5-di(t-butyl peroxy)hexane, di-t-butyl peroxide, or mixtures thereof.

Preferably, the organic peroxide is added to the polymer in an amount of from 0.05% to 8% by weight, more preferably from 0.1% to 5% by weight.

The accessory according to the present invention advantageously comprises at least one stress-relief cone having semiconductive properties to control the electric field generated by the electrical cable on which the accessory is mounted. The stress-relief cone is preferably formed by a crosslinked polymeric material, more preferably the same crosslinked polymer material used for the electrically insulating element, and at least one conductive filler, preferably a carbon black filler.

The provision of a scavenging layer in a radial external position with respect to a stress-relief cone, preferably in direct contact with, advantageously improves the controlling of the electrical field.

The accessory may also comprise at least one semiconducting layer which surrounds the electrically insulating element. In a preferred embodiment, the semiconducting layer is placed between the insulating element and the scavenging layer so that the latter is partially in direct contact with the semiconducting layer. This accessory design is advantageous from a manufacturing point of view because the scavenging layer can be applied as latest layer without altering the manufacturing setup for the radially internal layers.

The semiconducting layer is preferably formed by a crosslinked polymeric material, more preferably the same crosslinked polymer material used for the electrically insulating element, and at least one conductive filler, preferably a carbon black filler. The conductive filler is generally dispersed within the crosslinked polymeric material in a quantity such as to provide the material with semiconducting properties, namely to obtain a volumetric resistivity value, at room temperature, of less than 500 Ω·m, preferably less than 20 Ω·m. Typically, the amount of carbon black can range between 1 and 50% by weight, preferably between 3 and 30% by weight, relative to the weight of the polymer.

The production of the accessory according to the present invention can be carried out according to known techniques.

BRIEF DESCRIPTION OF THE DRAWING

Further characteristics will be apparent from the detailed description given hereinafter with reference to the accompanying drawings, in which.

DETAILED DESCRIPTION OF THE PREFERRED EMBODIMENTS

Figure 1:
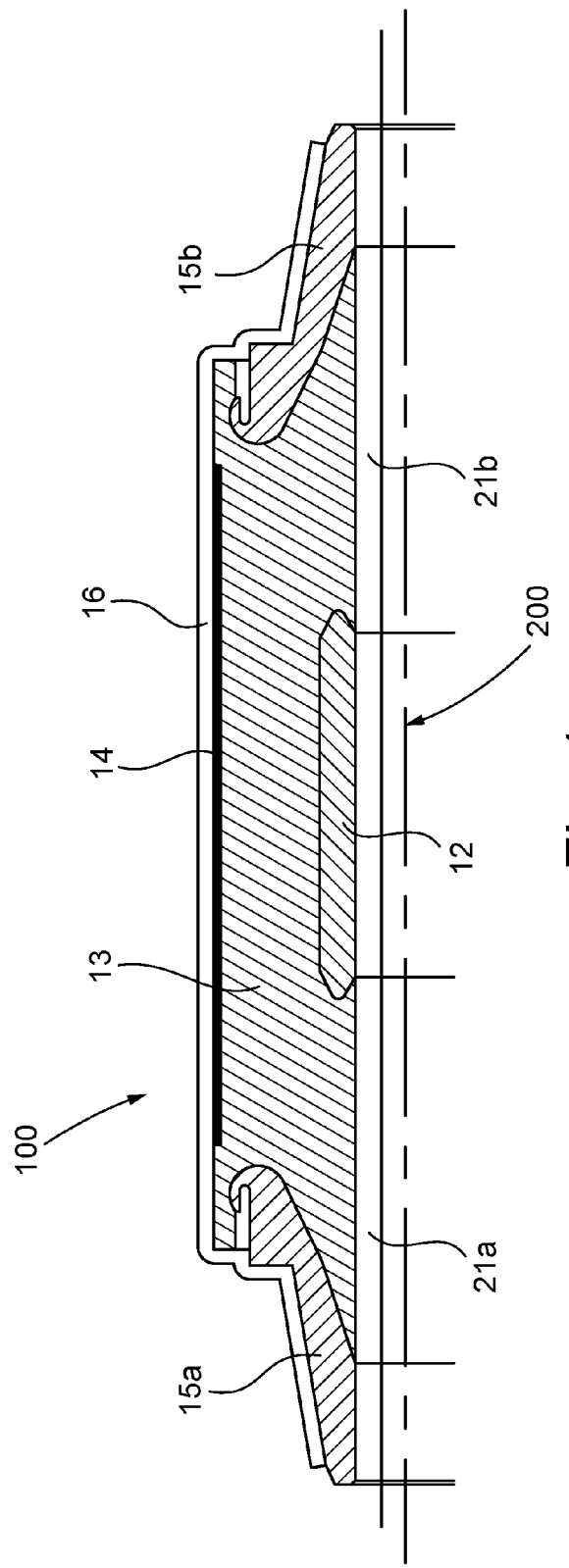
FIG. 1 is a partial longitudinal cross section of a joint, particularly suitable for HVDC cables, according to the present invention.

In FIG. 1, a longitudinal section of a preferred embodiment of a joint (100) mounted on a pair of joined electrical cables (200) according to the present invention is schematically represented.

Each cable of the joined pair cable (200) comprises a conductor (not shown in the figure) and an insulating layer (21a, 21b) made, for example, from crosslinked polyethylene (XLPE). When the pair of cables (200) is for use for HVDC power transport, the insulating layers (21a, 21b) are degassed to abate the concentration of cross-linking by-products under a predetermined threshold of, for example, 0.5 wt %.

The joint (100) comprises: an insulating element (13), made of, e.g., cross-linked and non-degassed EPDM, encircling and being in contact with the cable insulating layer (21a, 21b) of the electrical cable (200). A semiconductive electrode (12) which is embedded in said electrically insulating element (13) encircles the cable (200) where the cable insulating layers (21a, 21b) are removed to bare the cable conductors then joined, and can encircle a limited portion of the insulating layers (21a, 21b) in the vicinity of the removal zone.

The joint (100) further comprises an outer semiconducting layer (14) encircling the electrically insulating element (13) and two stress-relief cones (15a, 15b). Two stress-relief cones (15a, 15b), made of polymeric material, for example of cross-linked ethylene propylene rubber are provide each at a side of the electrically insulating element (13).

A scavenging layer (16) comprising zeolite particles is located in a radial outer position with respect to the insulating element (13), the outer semiconducting layer (14) and the stress-relief cones (15a, 15b). According to an embodiment of the present invention, the scavenging layer (16) can be a polymer layer, for example, from a material of those listed for the insulating element (13) and comprising zeolite particles dispersed therein.

Figure 2:
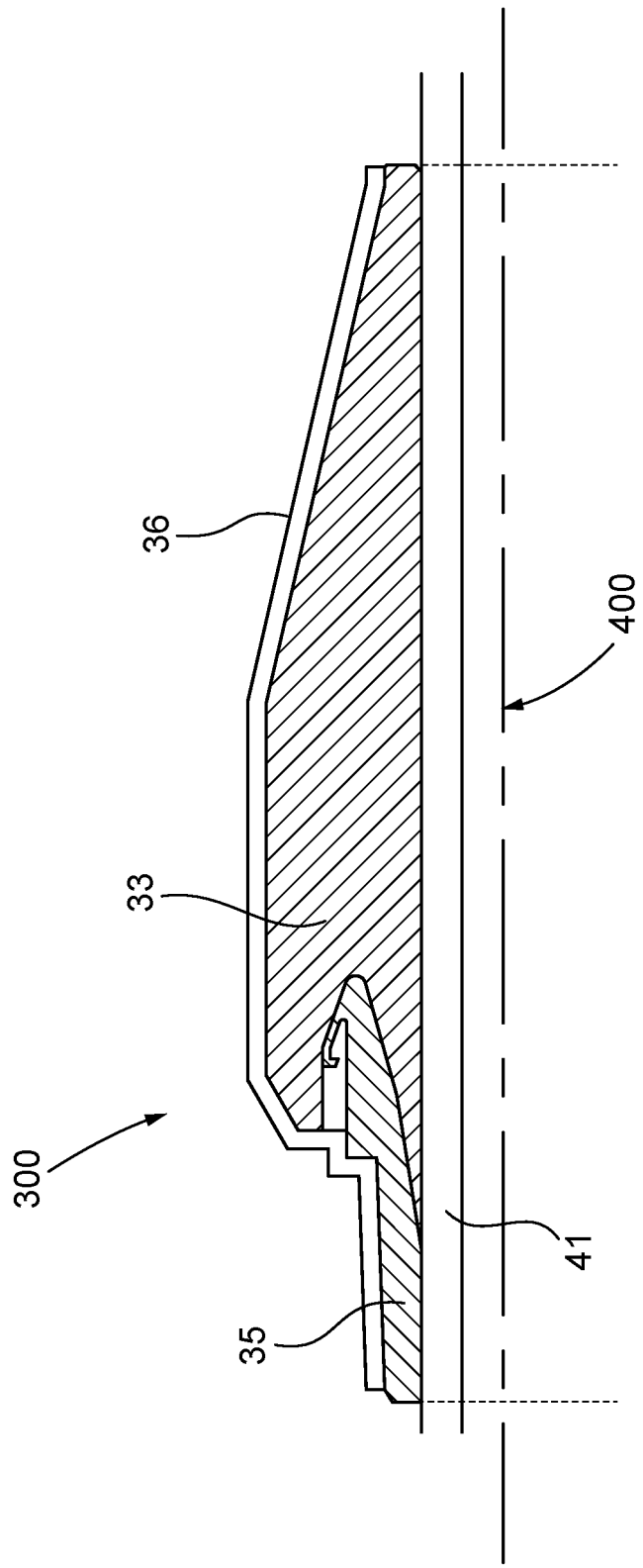
FIG. 2 is a partial longitudinal cross section of a termination, particularly suitable for HVDC cables, according to the present invention.

In FIG. 2, a longitudinal section of a preferred embodiment of a termination (300) mounted on an electrical cable (400) according to the present invention is schematically represented.

The electrical cable (400) comprises a conductor (not shown in the figure) and an insulating layer (41) made, for example, from crosslinked polyethylene (XLPE), similar to those already disclosed above in connection with the pair of cable (200).

The termination (300) comprises: an insulating element (33), made for example from cross-linked and non-degassed EPDM, surrounding and in contact with the insulating layer (41) of the electrical cable (400) and a stress-relief cone (35) also surrounding and in contact with the insulating layer (41).

A scavenging layer (36) comprising zeolite particles is located in a radial outer position with respect to the insulating element (33) and the stress-relief cone (35) and in contact thereto. The scavenging layer (36) is a polymeric layer made from a material of those listed for the insulating element (33) and comprising zeolite particles dispersed therein.

In both the embodiments shown in FIGS. 1 and 2, the zeolites of the scavenging layer (16, 36) draw and capture the crosslinking by-products present in the insulating element (13, 33) thus preventing their migration towards the insulating layer (21a, 21b, 41) of the cable/pair of cables (400, 200). Without wishing to be bound to such theory, as the zeolites absorb the crosslinking by-products, the concentration of such product decreases in the portion of the insulating element (13, 33) nearer to the scavenging layer (16, 36). This decrease causes a migration of further amounts of crosslinking by-products in the direction of the scavenging layer (16, 36) and, as a consequence, away from the cable insulating layer (21a, 21b, 41).

FIGS. 1 and 2 show two embodiments of the present invention. Suitable modifications can be made to these embodiments according to specific technical needs and application requirements without departing from the scope of the invention.

The following examples are provided to further illustrate the invention.

EXAMPLES 1-7

Some tests were carried out to evaluate the ability of different materials to absorb cumyl alcohol, one of the major by-products deriving from crosslinking reaction of polyethylene with cumyl peroxide. Each material in the form of fine particles was placed in an amount of about 0.6 g in little bags made from a non-woven polyester fabric, which are porous so as to allow free migration of cumyl alcohol molecules.

The little bags of the materials to be tested were placed in a cylinder made from aluminum, having a plurality of recesses to host the samples and a central circular cavity where a glass beaker containing cumyl alcohol was placed. In one of the recesses a fully degassed sample of crosslinked polyethylene (XLPE) was placed to measure the solubility of cumyl alcohol in that material as reference. The cylinder, containing the little bags of the materials to be tested, the sample of XLPE and the cumyl alcohol, was fastened with a closing plate provided with an O-ring to obtain an airtight closure. The amount of cumyl alcohol absorbed by each sample was measured by weighing the sample at regular intervals up to 1460 hours of exposure to cumyl alcohol when asymptotic conditions have been reached at all temperatures in the 40° to 70° C. range. The solubility of cumyl alcohol in each sample was calculated as:

$$C.A. \text{ solubility} = \frac{C.A. \%}{p(C.A.)}$$

wherein:
C.A. % is the weight percentage of cumyl alcohol absorbed by the sample with respect to the initial weight of the sample;
p(C.A.) is the vapour tension of cumyl alcohol at the testing temperature (expressed in bar).

The test was carried out at different temperatures (40° C., 60° C. and 70° C.). The results are reported in Table 1.

TABLE 1

| | | C.A. Solubility (% w/bar) | | |
|---|---|---|---|---|
| Example | Material | 40° C. | 60° C. | 70° C. |
| 1 (*) | XLPE | 15,804 | 7,648 | 5,421 |
| 2 (*) | Dellite 72T | 106,438 | 24,068 | 19,322 |
| 3 (*) | Carbon D | 212,452 | 52,204 | 35,184 |
| 4 (*) | Supercarb | 241,933 | 61,572 | 41,330 |
| 5 (*) | J550 | 278,031 | 20,396 | 26,292 |
| 6 | CBV 600 | 1,154,989 | 257,433 | 131,559 |
| 7 | CBV 712 | 1,151,132 | 255,940 | 128,989 |

The examples marked with an asterisk (*) are comparative.
XLPE: polyethylene (Borealis LE 4253) crosslinked by cumyl peroxide (1.45 wt %, preheating at 120° C. for 2 minutes, heating at 150° C. for 15 minutes and final cooling at 20° C.);
Dellite 72T: montmorillonite nanoclay modified with quaternary ammonium salt (Laviosa Chimica Mineraria S.p.A.);
Carbon D: active carbon Carbon Decolorans code 434507 (Carlo Erba, IT)
Supercarb: active carbon Adsorbent 2-4566 (SUPELCO, Bellefonte Pa. USA)
J550: sodium polyacrylate resin Aqua keep 10SH-P (SUMITOMO SEIKA)
CBV 600: Y-type zeolite having: specific surface area=660 m$^2$/g; SiO$_2$/Al$_2$O$_3$ ratio=5.2; Na$_2$O %=0.2; dimensionality=3; maximum diffusing sphere diameter=7.35 Å (ZEOLYST);
CBV 712: Y-type zeolite having: specific surface area=730 m$^2$/g; SiO$_2$/Al$_2$O$_3$ ratio=12; Na$_2$O %=0.05; dimensionality=3; maximum diffusing sphere diameter=7.35 Å (ZEOLYST).

From the data reported in Table 1, it is apparent that in the Example 6 and 7 according to the invention the zeolites are able to absorb cumyl alcohol in large amounts, much greater than those obtainable by means of other absorbing materials, such as montmorillonite nanoclay, carbon particles and sodium polyacrylate resin, a water absorbing material commonly used in energy cables.

EXAMPLES 8-11

In order to simulate the conditions in an accessory for energy cable, the absorption ability of zeolite CBV 600 was evaluated according to the following method.

A crosslinkable ethylene/propylene/diene copolymer (EPDM) commonly used as insulating material for DC accessory, was used to produce discs of freshly crosslinked polymer material as disclosed above.

Figure 3:
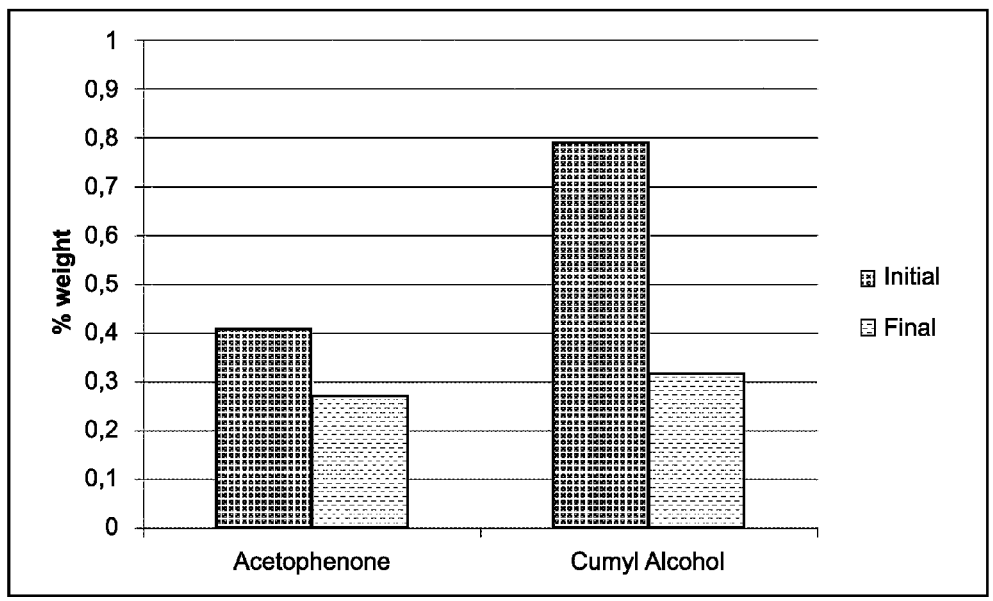
FIGS. 3, 4 and 5 show some experimental results obtained according to the examples reported hereinbelow.
Figure 4:
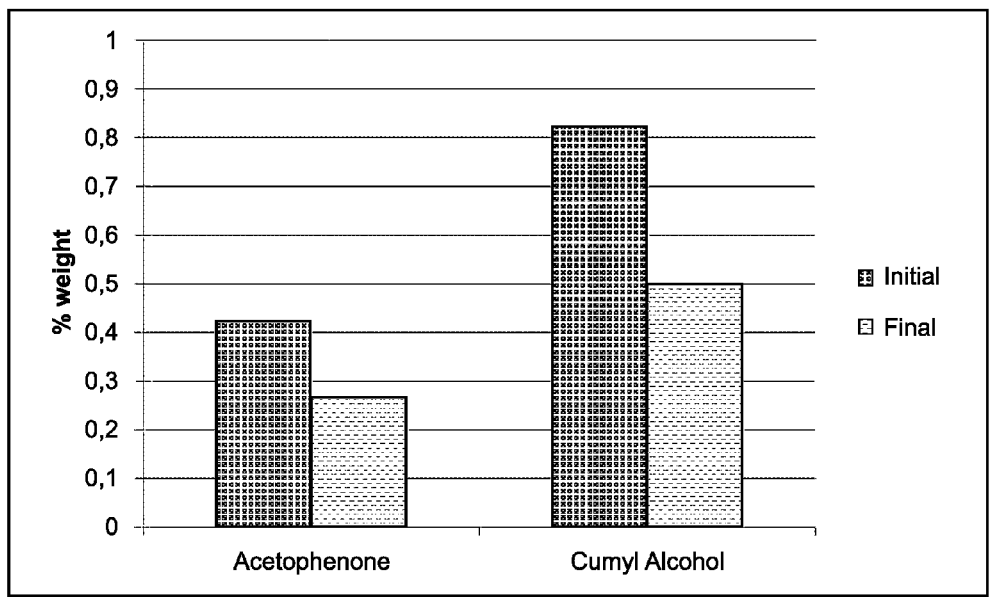

A disc of freshly crosslinked EPDM (diameter 140 mm, thickness 2.87 mm) was placed in a cylinder similar to that of Examples 1-7, but devoid of recesses and cavity to host samples and container, and three little bags as described in Examples 1-7 containing zeolite CBV 600 were placed on the disc (weight ratio zeolite/EPDM=0.013). The testing device was closed airtight and maintained at the testing temperature (60° C. or 40° C.) for 16 days. In the diagrams of FIGS. 3-4, the amounts of acetophenone and cumyl alcohol in the EPDM disc as such (i.e. just after crosslinking) and after contact with the zeolite are reported. A remarkable reduction of the amount of crosslinking by-products in the insulating material when placed in contact with the zeolite particles is apparent.

EXAMPLES 12-13

Figure 5:
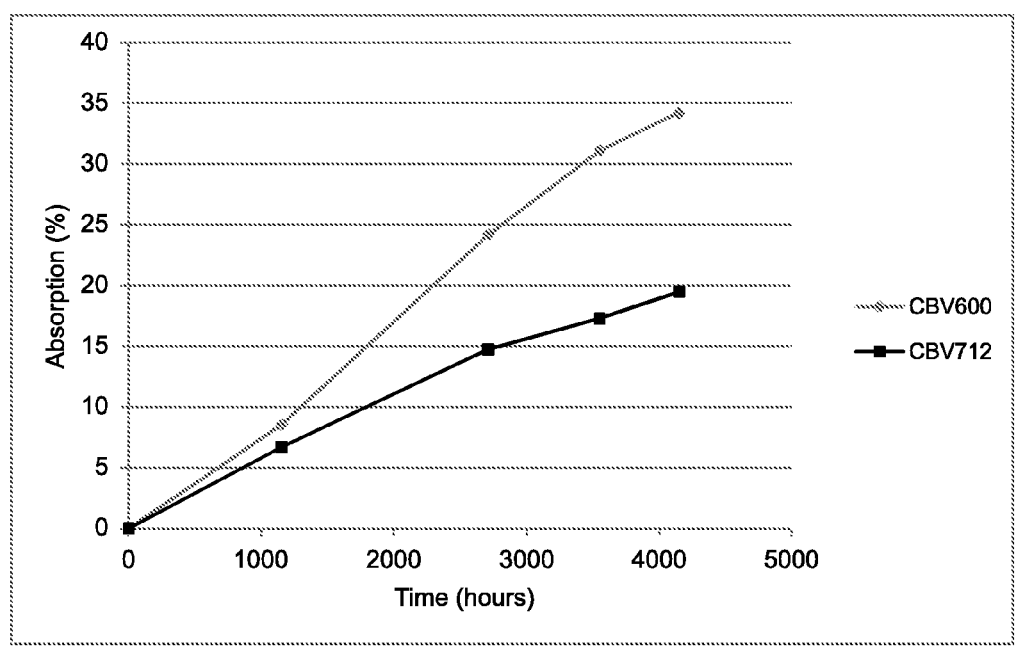

In order to evaluate the ability of the zeolite particles to absorb the crosslinking by-products even during storage at room temperature, a sample of zeolite CBV600 (Example 12) or of zeolite CBV712 (Example 13) was placed into a bag made from Polylam™, where also a small container containing cumyl alcohol was placed. The bag was hermetically closed. The amount of cumyl alcohol absorbed by the zeolite sample was measured over time by extracting the zeolite sample from the bag after a certain time. The results are reported in the diagram of FIG. 5, from which it appears that the zeolite continued to absorb cumyl alcohol even after more than 4000 hours of exposure at 23° C. From these data, we can derive that the zeolite particles placed in the vicinity of the insulating layer of a cable accessory should be able to eliminate the crosslinking by-products also at ambient temperature.

The invention claimed is:
1. Accessory for high voltage direct current (HVDC) energy cables comprising: at least one element made from a crosslinked elastomeric polymer material, and at least one scavenging layer comprising zeolite particles, wherein the zeolite particles have a $SiO_2/Al_2O_3$ molar ratio equal to or lower than 15, and wherein the zeolite particles have a sodium content, expressed as $Na_2O$, equal to or lower than 0.3% by weight.

2. The accessory according to claim 1, wherein said scavenging layer is applied in a radial external position with respect to the element made from a crosslinked elastomeric polymer material.

3. The accessory according to claim 2, wherein the element made from a crosslinked elastomeric polymer material is a least one of an insulating element and a stress-relief cone.

4. The accessory according to claim 3, wherein said scavenging layer is applied in direct contact with the insulating element.

5. The accessory according to claim 3, wherein an outer semiconducting layer is interposed between the insulating element and the scavenging layer.

6. The accessory according to claim 1, wherein said scavenging layer is in a form selected from a polymeric sheath or a tape.

7. The accessory according to claim 6, wherein said tape is a self-amalgamating tape or a hygroscopic tape.

8. The accessory according to claim 1, wherein the zeolite particles have a maximum diameter of a sphere than can diffuse along at least one of the cell axes directions equal to or greater than 3 Å.

9. The accessory according to claim 1, wherein said scavenging layer comprises a polymer material selected from elastomeric copolymers of the ethylene with at least one alpha-olefin, silicon polymers, polymers or copolymers of butane, butyl rubbers and mixture thereof.

10. The accessory according to claim 1, wherein said scavenging layer comprises a polymer material having a 200% elastic modulus of from 2 MPa and 8 MPa according to ASTM D638-10.

11. The accessory according to claim 1, said accessory being an electrical cable joint.

12. The accessory according to claim 1, said accessory being an electrical cable termination.

* * * * *